United States Patent
Xiao et al.

(10) Patent No.: US 11,558,315 B2
(45) Date of Patent: Jan. 17, 2023

(54) CONVERGED NETWORK INTERFACE CARD, MESSAGE CODING METHOD AND MESSAGE TRANSMISSION METHOD THEREOF

(71) Applicant: NATIONAL UNIVERSITY OF DEFENSE TECHNOLOGY, Hunan (CN)

(72) Inventors: Liquan Xiao, Hunan (CN); Junsheng Chang, Hunan (CN); Mingche Lai, Hunan (CN); Zhengbin Pang, Hunan (CN); Pingjing Lu, Hunan (CN); Zhang Luo, Hunan (CN); Yuan Li, Hunan (CN); Jianmin Zhang, Hunan (CN); Xingyun Qi, Hunan (CN); Jinbo Xu, Hunan (CN); Yan Sun, Hunan (CN); Dezun Dong, Hunan (CN)

(73) Assignee: NATIONAL UNIVERSITY OF DEFENSE TECHNOLOGY, Hunan (CN)

(*) Notice: Subject to any disclaimer, the term of this patent is extended or adjusted under 35 U.S.C. 154(b) by 154 days.

(21) Appl. No.: 17/109,146

(22) Filed: Dec. 2, 2020

(65) Prior Publication Data
US 2021/0367906 A1  Nov. 25, 2021

(30) Foreign Application Priority Data
May 21, 2020 (CN) .......................... 202010438897.1

(51) Int. Cl.
*H04L 12/935* (2013.01)
*H04L 49/00* (2022.01)
(Continued)

(52) U.S. Cl.
CPC .......... *H04L 49/30* (2013.01); *G06F 13/4022* (2013.01); *G06F 13/4282* (2013.01); *H04L 49/101* (2013.01); *G06F 2213/0026* (2013.01)

(58) Field of Classification Search
CPC ............. G06F 13/4022; G06F 13/4282; G06F 2213/0026; H04L 49/101; H04L 49/30; H04L 49/3018; H04L 49/3027
(Continued)

(56) References Cited

U.S. PATENT DOCUMENTS

| 10,019,401 | B1* | 7/2018 | Wilde | G06F 13/4022 |
| 2020/0210114 | A1* | 7/2020 | Hu | G06F 16/2379 |
| 2021/0119930 | A1* | 4/2021 | Debbage | H04L 1/1642 |

* cited by examiner

*Primary Examiner* — Robert J Lopata
(74) *Attorney, Agent, or Firm* — JCIP Global Inc.

(57) ABSTRACT

The invention provides a converged network interface card, a message coding method and a message transmission method thereof. The converged network interface card comprises a PCIE host interface processing module, a high speed network card core logic, a crossbar switch XBAR, an Ethernet network card core logic, an Ethernet message dicing/slicing module, a physical layer, a high speed network/Ethernet message conversion module EoH, and a high speed network/Ethernet configurable network port. The invention supports customized high speed interconnection interface and a standard Ethernet interface on a set of network hardware, and supports three working modes on a set of physical hardware (high speed network mode, Ethernet mode and EoH mode transmitting Ethernet messages over the high speed network), implements seamless compatibility between the high speed network/Ethernet, and flexibly supports multimode applications such as scientific computing and cloud computing.

9 Claims, 6 Drawing Sheets

(51) Int. Cl.
*G06F 13/40* (2006.01)
*G06F 13/42* (2006.01)
*H04L 49/101* (2022.01)

(58) Field of Classification Search
USPC ........................................................ 370/329
See application file for complete search history.

CONVERGED NETWORK INTERFACE CARD, MESSAGE CODING METHOD AND MESSAGE TRANSMISSION METHOD THEREOF

CROSS-REFERENCE TO RELATED APPLICATION

This application claims the priority benefit of China application serial no. 202010438897.1, filed on May 21, 2020. The entirety of the above-mentioned patent application is hereby incorporated by reference herein and made a part of this specification.

BACKGROUND

Technical Field

The invention relates to the field of high performance interconnection network design, in particular to a high speed network/Ethernet converged network interface card supporting Ethernet and high speed network connection on a same set of network hardware, a message coding method and a message transmission method thereof.

Description of Related Art

At present, two networks (high speed network (also "high performance express") and Ethernet) are available for high performance computers. Traditional high performance computer systems such as Galaxy and Tianhe computers are mainly for computing-intensive high performance computing in terms of application field, and use high speed network interface cards (referred to as "high speed network card") for private interconnection network thereof (referred to as "high speed network") based on RDMA (remote direct memory access) protocol. With the rise of data-intensive applications such as big data and cloud computing, high performance computers are used not only in computing-intensive high performance computing, but also in data-intensive big data, cloud computing and other applications, and the interconnection network of such computers use Ethernet network card based on TCP/IP protocol.

As shown in FIG. 1A, a traditional high speed network card mainly comprises a PCIE host interface processing module, a high speed network card core logic, a crossbar switch XBAR, a high speed network port and a physical layer. The PCIE host interface processing module is connected with nodes in a high performance computer system for communication with the PCIE interface, connect all the nodes in the high performance computer system to a network, and process data to be transmitted by the nodes into a high speed network message (MP message) through the high speed network card core logic. For a message from the physical layer, the PCIE host interface processing module receives the message from the high speed network card core logic, and then sends the message to the nodes in the connected high performance computer system via the PCIE interface. A high performance high speed network card may comprise multiple host interfaces or network ports. A XBAR comprises routing table configuration files, implements allocation of PCIE traffic in the multiple network ports or host interfaces according to the routing table configuration file, performs unblocked exchange of message traffic received from the high speed network card core logic among the multiple network ports according to the routing table configuration, sends a dynamically allocated message to the high speed network ports, and then transmits the message through the physical layer. For a message from the physical layer, the XBAR receives the message from the high speed network port, and sends the message to the high speed network card core logic according to the routing table configuration if the message arrives at the present node; or sends the message to the corresponding high speed network ports according to the routing table configuration if the message does not arrive at the present node, and then sends out the message through the physical layer.

For a message from the present node, the traditional high speed network card is processed as follows: (1) the PCIE host interface processing module receives the message from a node in the connected high performance computer system via the PCIE interface, and sends the message to the high speed network card core logic; (2) the high speed network card core logic processes the message into a high speed network message, and then sends the message to the crossbar switch XBAR; (3) the crossbar switch XBAR receives the high speed network message from the high speed network card core logic, then exchanges the high speed network message traffic among multiple network ports without blocking, and then sends the dynamically allocated message to the corresponding high speed network port according to the routing table configuration; and (4) the high speed network port transmits the message received from the XBAR through the physical layer.

For a message from other nodes through the physical layer, the traditional high speed network card is processed as follows: (1) the high speed network port receives the message from the physical layer and sends the message to the XBAR; (2) the XBAR receives the message from the high speed network port, and sends the message to the high speed network card core logic according to the routing table configuration if the message arrives at the present node; or sends the message to the corresponding high speed network ports according to the routing table configuration if the message does not arrive at the present node, and then sends out the message through the physical layer. (3) the high speed network core logic receives the message from the XBAR, and sends the message to the PCIE host interface processing module after processing; and (4) the PCIE host interface processing module receives the message from the high speed network card core logic, and then transmits the message to the nodes in the connected high performance computer system via the PCIE interface.

As shown in FIG. 1B, a traditional Ethernet network card mainly comprises a PCIE host interface processing module, an Ethernet network card core logic, an Ethernet message dicing/slicing module (Dicing/Slicing module), an Ethernet network port and a physical layer. The PCIE host interface processing module is connected with nodes in big data, cloud computing and other systems, connects the nodes to a network, and then processes the data to be transmitted by the nodes into an Ethernet message through the Ethernet network card core logic, and then sends the message to the Ethernet message dicing/slicing module. For an Ethernet message from the physical layer, the PCIE host interface processing module receives the Ethernet message from the Ethernet network card core logic, and then transmits the message to the connected node via the PCIE interface. The Ethernet message dicing/slicing module receives the Ethernet message from the Ethernet network card core logic, dices the Ethernet message into Ethernet message slices, and then sends the Ethernet message slices to the Ethernet network port, and then transmits the Ethernet message through the physical layer. For an Ethernet message from the physical layer, the Ethernet message dicing/slicing module receives the Ethernet message slices from the Ethernet network port, dices/slices the Ethernet message slices into an Ethernet message, and then sends the Ethernet message to the Ethernet network card core logic. The Ethernet core logic receives the Ethernet message from the Ethernet message dicing/slicing module, and then sends the Ethernet message to the PCIE host interface processing module after processing; and then transmits the message to the connected node via the PCIE interface.

For a message from the present node, the traditional Ethernet network card is processed as follows: (1) the PCIE host interface processing module receives the message from the connected nodes through the PCIE interface, and sends the message to the Ethernet network card core logic; (2) the Ethernet network card core logic processes the message into an Ethernet message, and then sends the Ethernet message to the Ethernet message dicing/slicing module; (3) the Ethernet message dicing/slicing module receives the Ethernet message from the Ethernet network card core logic, dices the Ethernet message into multiple Ethernet message slices, and then sends the Ethernet message slices to the Ethernet network port; and (4) the Ethernet network port transmits the Ethernet message slices received from the Ethernet message dicing/slicing module through the physical layer.

For a message from other nodes through the physical layer, the traditional Ethernet network card is processed as follows: (1) the Ethernet network port receives Ethernet message slices from the physical layer and sends the message slices to the Ethernet message dicing/slicing module; (2) after receiving the Ethernet message slices from the Ethernet network port, the Ethernet message dicing/slicing module dices/slices the Ethernet message slices into an Ethernet message, and then sends the Ethernet message to the Ethernet network card core logic; (3) the Ethernet core logic receives the Ethernet message from the Ethernet message dicing/slicing module, and then sends Ethernet message to the PCIE host interface processing module after processing; and (4) the PCIE host interface processing module receives the Ethernet message from the Ethernet network card core logic, and then transmits the message to the connected node via the PCIE interface.

At present, two networks (high speed network and Ethernet) are available for high performance computers, and the related functions have certain duplication, overlap and waste of resources. Moreover, the high speed network and the Ethernet network cannot interconnect with each other, and only one network can run in the computer system at a time. Therefore, the next generation interconnection network should support multi-network convergence design as far as possible, support multiple applications such as computing-intensive and data-intensive applications, support multiple networks and protocols in a single network, and simplify network design and hardware resources.

SUMMARY

The high speed network/Ethernet converged network interface card of the invention comprises not only a PCIE host interface processing module, a high speed network card core logic, a crossbar switch XBAR, an Ethernet network card core logic, an Ethernet message dicing/slicing module, and a physical layer in the traditional Ethernet network card and high speed network card in the related art, but also a high speed network/Ethernet message conversion module EOH and a high speed network/Ethernet configurable network port.

A converged network interface card, comprises a PCIE host interface processing module, a high speed network card core logic, a crossbar switch XBAR, an Ethernet network card core logic, an Ethernet message dicing/slicing module, and a physical layer; and is characterized by further comprising a high speed network/Ethernet message conversion module EoH, and a high speed network/Ethernet configurable network port.

The PCIE host interface processing module is connected with nodes in a computer system, the high speed network card core logic and the Ethernet network card core logic, and is configured for communication with the PCIE interface, and connect the nodes in the system to a network. The PCIE host interface processing module receives messages from the nodes, and decides whether to send the messages from the nodes to the high speed network card core logic or the Ethernet network card core logic according to different communication modes of the nodes. It is judged based on that: when a node in communication with the present node is a high speed network node, the node needs to use the high speed network mode, and the PCIE host interface processing module sends the message to the high speed network card core logic; and when a node in communication with the present node is an Ethernet node, the node needs to use the Ethernet mode, and the PCIE host interface processing module sends the message to the Ethernet network card core logic. For a message from the physical layer, the PCIE host interface processing module receives the high speed network message from the high speed network card core logic, and then transmits the high speed network message to the connected node via the PCIE interface. The PCIE host interface processing module receives the Ethernet message from the Ethernet network card core logic, and then transmits the message to the connected node via the PCIE interface.

The high speed network card core logic is connected with the PCIE host interface processing module and the crossbar switch XBAR. The high speed network card core logic receives the message from the PCIE host interface processing module, processes the message into a high speed network message, and then sends the message to the crossbar switch XBAR. For a high speed network message from the physical layer, the high speed network core logic receives the message from the crossbar switch XBAR, and sends the message to the PCIE host interface processing module after processing;

The Ethernet network card core logic is connected with the PCIE host interface processing module and the Ethernet message dicing/slicing module. The Ethernet network card core logic receives the message from the PCIE host interface processing module, processes the message into an Ethernet message, and then sends the Ethernet message to the Ethernet message dicing/slicing module. For a message from the physical layer, the Ethernet core logic receives the Ethernet message from the Ethernet message dicing/slicing module, and then sends the Ethernet message to the PCIE host interface processing module after processing.

The crossbar switch XBAR is connected with the high speed network card core logic, the high speed network/Ethernet configurable network port, and the high speed network/Ethernet message conversion module EoH. The crossbar switch XBAR is configured to implement dynamic allocation of PCIE traffic in multiple network ports, exchanges the message traffic received from the high speed network card core logic or the high speed network/Ethernet message conversion module EoH among the multiple network ports without blocking, dynamically allocates the message, and sends the message to the high speed network/Ethernet configurable network port. For a message from the physical layer, the crossbar switch XBAR receives the message from the high speed network/Ethernet configurable network port. If the message information shows that the destination node of message transmission is the high speed network, the crossbar switch XBAR sends the message to the high speed network card core logic. If the message information shows that the destination node of message transmission is Ethernet, the crossbar switch XBAR sends the message to the high speed network/Ethernet message conversion module EoH.

The Ethernet message dicing/slicing module is connected with the Ethernet network card core logic, the high speed network/Ethernet configurable network port and the high speed network/Ethernet message conversion module EoH. The Ethernet message dicing/slicing module receives the Ethernet message from the Ethernet network card core logic, and dices the Ethernet message into Ethernet message slices. If the message information shows that the destination node of message transmission is the high speed network, the Ethernet message dicing/slicing module sends the Ethernet message slices to the high speed network/Ethernet message conversion module EoH. If the message information shows that the destination node of message transmission is Ethernet, the Ethernet message dicing/slicing module directly sends the Ethernet message slices to the high speed network/Ethernet configurable network port. For a message from the physical layer, the Ethernet message dicing/slicing module receives the Ethernet message slices from the high speed network/Ethernet message conversion module EoH or the high speed network/Ethernet configurable network port, dices/slices the Ethernet message slices into an Ethernet message, and then sends the Ethernet message to the Ethernet network card core logic.

The high speed network/Ethernet message conversion module EoH is connected with the crossbar switch XBAR and the Ethernet message dicing/slicing module. The high speed network/Ethernet message conversion module EoH virtualizes the high speed network into Ethernet, so that the nodes connected in the high speed network directly communicate with the nodes connected in the Ethernet network. The function of the high speed network/Ethernet message conversion module EoH is implemented by dicing the Ethernet message and encapsulating it in the high speed network message. The message formed by dicing the Ethernet message by the high speed network/Ethernet message conversion module EoH and encapsulating in the high speed network message is recorded as a long MP message. The high speed network/Ethernet message conversion module EoH receives the long MP message from the crossbar switch XBAR, deletes EOH head, converts the message into an Ethernet message, and sends the Ethernet message to the Ethernet message dicing/slicing module; or the high speed network/Ethernet message conversion module EoH receives the Ethernet message from the Ethernet message dicing/slicing module, encapsulates the EOH head, converts the message into a long MP message, and sends the long MP message to the XBAR.

The high speed network/Ethernet configurable network port is connected with the crossbar switch XBAR, the Ethernet message dicing/slicing module and the physical layer. The high speed network/Ethernet configurable network port receives a high speed network message from the crossbar switch XBAR, is configured as a high speed network port, and then transmits the high speed network message via the physical layer. The high speed network/Ethernet configurable network port receives an Ethernet message from the Ethernet message dicing/slicing module, is configured as an Ethernet network port, and then transmits the Ethernet message via the physical layer. For a message from the physical layer, the high speed network/Ethernet configurable network port sends the received high speed network messages to the crossbar switch XBAR or the received Ethernet messages to the Ethernet message dicing/slicing module according to the message configuration.

The physical layer is connected with the high speed network/Ethernet configurable network port and network interface cards or routers of other external nodes. The physical layer receives the high speed network message or the Ethernet message from the high speed network/Ethernet configurable network port, and transmits the message to other nodes.

As a further improvement to the technical solution of the invention, the high speed network/Ethernet message conversion module EoH comprises three modules: (1) the Ingress pipeline used as a data input processing pipeline processing logic; (2) Egress pipeline used as a processing logic for data output processing pipeline; and (3) a control and status register CSR module. The Ingress pipeline receives the long MP message from the XBAR, deletes the EOH head, converts the message into an Ethernet message, and sends the Ethernet message to the Ethernet message dicing/slicing module. The Egress pipeline receives the Ethernet message from the Ethernet message dicing/slicing module, encapsulates the EOH head, converts the Ethernet message into a long MP message, and sends the long MP message to the XBAR. The CSR module controls the Ingress pipeline and the Egress pipeline through register configuration.

The Ingress pipeline of the EoH module comprises three logic submodules: an Ingress input buffer, an Ingress message checking module and an Ingress message format conversion module.

The Ingress input buffer is connected with the crossbar switch XBAR and the Ingress message checking module. The Ingress input buffer receives the long MP message from the crossbar switch XBAR and stores the message in the Ingress input buffer.

The Ingress message checking module is connected with the Ingress input buffer and the Ingress message format conversion module. The Ingress message checking module reads the long MP message from the Ingress input buffer, checks correctness of the long MP message, and then sends the high speed network message to the Ingress message format conversion module.

The Ingress message format conversion module is connected with the Ingress message checking module and the Ethernet message dicing/slicing module. The Ingress message format conversion module comprises an Ingress output FIFO. The Ingress message format conversion module receives the long MP message from the message checking module, deletes the EoH head information, de-encapsulates the long MP message to generate Ethernet message slices, stores the Ethernet message slices in the Ingres output FIFO, and dices and sends the Ethernet message slices stored in the Ingres output FIFO into the Ethernet message dicing/slicing module in the Ethernet in sequence.

The Egress pipeline comprises four logic submodules: an Egress input buffer, an Egress message format conversion module, an Egress output FIFO and an Egress message output module.

The Egress input buffer is connected with the Ethernet message dicing/slicing module and the Egress message format conversion module. The Egress input buffer receives the Ethernet message slices from the Ethernet message dicing/slicing module and caches the Ethernet message slices to the Egress input buffer.

The Egress message format conversion module is connected with the Egress input buffer and the Egress output FIFO. An Egress direction core module completes the function of Ethernet message slice reorganization, fills in the route information of the Ethernet message after the reorganization, and constructs the EoH head. The Egress message format conversion module reads the Ethernet message slices from the Egress input buffer, constructs the EoH head, cuts message payload according to slice configuration, fills single sequence message length/sequence number count/total message length in an LLP head, distinguish message sequence slices by the head and tail information, encapsulates the Ethernet message into a long MP message, and then stores the long MP message into the Egress output FIFO.

The Egress output FIFO is connected with the Egress message format conversion module and the Egress message output module. The Egress output FIFO receives and caches the long MP message from the Egress message format conversion module.

The Egress message output module is connected with the Egress output FIFO and the crossbar switch XBAR. The Egress message output module reads the long MP message from the Egress output FIFO and outputs the message to the crossbar switch XBAR.

As a further improvement to the technical solution of the invention, the CSR module access uses the standard CSR ring structure, bit width of the register is 64 bits, and access address of the register is 20 bits, including 8-bit module address and 12-bit internal offset address of the module. The CSR module provides two CSR connection interfaces to the outside, namely one table CSR and one logical CSR. The table CSR cascades the tables in the high speed network/Ethernet message conversion module EoH, while the logical CSR cascades the submodules of the Ingress pipeline and the Egress pipeline in the high speed network/Ethernet message conversion module EoH.

As a further improvement to the technical solution of the invention, read-write access of the register in the CSR ring structure is implemented as follows: each module instantiates a ring register access common module csr_chain, register access request is passed on the ring, each module on the CSR ring processes the request based on the register access address, and if the request is the register access of the module address, the corresponding register read-write processing is performed. Each module on the CSR ring passes the register access response to the register processing master control module in turn.

As a further improvement to the technical solution of the invention, the Ingress input buffer and the Egress input buffer are multi-VC shared buffer DAMQ (dynamic allocated memory queue), and messages are stored and scheduled via the buffer are multi-VC shared buffer DAMQ.

As a further improvement to the technical solution of the invention, the data encapsulated by the Egress message format conversion module not only the Ethernet messages but also 6-byte EoH head to better support MOD_ID and NIC_ID mapping relationship learning and other functions. As shown in FIG. 5, from low bit to high bit, each domain of the EoH head is described as follows: [8:0] is the module number MOD_ID of transmitting end, and the domain name is recorded as SrcModID; [17:9] is the number MOD_ID of receiving end module, and the domain name is recorded as DestModID; [25:18] is the length of Ethernet message, and the domain name is recorded as ByteCnt; [45:26] is the NIC_ID of transmitting end, and the domain name is recorded as SrcID; and [47:46] is a reserved bit, and the domain name is recorded as Rsv. The MOD_ID refers to module number, which is a field composed of network interface chip number and network port number and configured to identify message source and destination addresses. The NIC_ID is the number of the Ethernet network card in the high speed network. To access the high speed network, the Ethernet network card needs a number on the high speed network, the NIC_ID is the high speed network number of the Ethernet network card.

The invention further provides a message coding method based on the converged network interface card, relating to message format from the direction of the XBAR, message format sent to the direction of the Ethernet message dicing/slicing module, and the message received from the direction of the Ethernet message dicing/slicing module, which are detailed respectively as follows:

(1) message format from the direction of the XBAR: the sequence messages are designed to be fixed length+variable length sequence tail message mode; the length of the fixed length sequence message is recorded as K message slices, the length of the variable length sequence tail message is recorded as K' message slices, K and K' are natural numbers, and K'≤K; During message encapsulation, when the data content is enough to be encapsulated into K message slices, the data content is encapsulated into K message slice messages, and for the insufficient part of remaining data to be encapsulated into K message slices, the message length is determined according to the remaining data length, and a short format is preferred for encapsulation;

(2) message format to the direction of the Ethernet message dicing/slicing module: the interface to the direction of the Ethernet message dicing/slicing module follows the following rules: (1) the Ethernet message length range is 64-1536B; (2) the data channel bit width is 32B; and when the last beat of data tails, the significant byte number signal LBO of the last beat is enabled; (3) Credits Sop_valid, Eop_valid and Mop_valid of SOP (start of package), MOP (middle of package), and EOP (end of package) are separately controlled; (4) credit Sop_valid of packet head SOP needs to be continuously fixed to be ≤128B; and a single message ends when Eop_valid and tail are valid for the Ethernet message dicing/slicing module; and (3) the message received from the Ethernet message dicing/slicing module: the first and second beats of the message received from the Ethernet message dicing/slicing module are an egress queue descriptor QD and an ingress package descriptor PD respectively, and the Ethernet message starts from the third beat.

As a further improvement to the technical solution of the invention, the sequence tail message with variable length (4/6/10flit format) is coded as follows: a long MP 10flit message contains 1 head flit, 1 tail flit and 8 data flits, that is, the message only contains 256B data; a long MP 6flit message contains 1 head flit, 1 tail flit and 4 data flits, that is, the message only contains 128B data; and a long MP 4 flit message contains 1 head flit, 1 tail flit and 2 data flits, that is, the message contains only 64B data.

As a further improvement to the technical solution of the invention, the length of the MOP in the message received from the direction of the Ethernet message dicing/slicing module is diced by 176B.

As a further improvement to the technical solution of the invention, when the MOP slices cannot be exactly divided by the Ethernet message dicing/slicing module and the EoH data path bit width, the EoH Egress direction will be dislocated, and the data will be fully filled after data dislocation.

The invention further provides a message transmission method based on the converged network interface card, relating to three communication modes: high speed network mode, Ethernet mode and EoH mode, and specific communication mode depends on protocol configuration:

(I) The message transmission method in the high speed network mode is as follows:

For the message from the present node, the processing flow is as follows: (1) the PCIE host interface processing module receives the message from a node in the connected high performance computer system via the PCIE interface, and sends the message to the high speed network card core logic; (2) the high speed network card core logic processes the message into a high speed network message, and then sends the message to the crossbar switch XBAR; (3) the crossbar switch XBAR receives the high speed network message from the high speed network card core logic, then exchanges the high speed network message traffic among multiple network ports without blocking, and then sends the dynamically allocated message to the corresponding high speed network/Ethernet configurable network port according to the routing table configuration; and (4) the high speed network/Ethernet configurable network port transmits the message received from the crossbar switch XBAR through the physical layer.

For a message from other nodes through the physical layer, the processing flow is as follows: (1) the high speed network/Ethernet configurable network port receives the message from the physical layer and sends the message to the crossbar switch XBAR; (2) the crossbar switch XBAR receives the message from the high speed network/Ethernet configurable network port, and sends the message to the high speed network card core logic according to the routing table configuration if the message arrives at the present node; or sends the message to the corresponding high speed network/Ethernet configurable network port according to the routing table configuration if the message does not arrive at the present node, and then sends out the message through the physical layer. (3) the high speed network core logic receives the message from the crossbar switch XBAR, and sends the message to the PCIE host interface processing module after processing; and (4) the PCIE host interface processing module receives the message from the high speed network card core logic, and then transmits the message to the nodes in the connected high performance computer system via the PCIE interface.

(II) The message transmission method in the Ethernet mode is as follows:

The message from the present node is processed as follows: (1) the PCIE host interface processing module receives the message from the connected node through the PCIE interface, and sends the message to the Ethernet network card core logic; (2) the Ethernet network card core logic processes the message into an Ethernet message, and then sends the Ethernet message to the Ethernet message dicing/slicing module; (3) the Ethernet message dicing/slicing module receives the Ethernet message from the Ethernet network card core logic, dices the Ethernet message into multiple Ethernet message slices, and then sends the Ethernet message slices to the high speed network/Ethernet configurable network port; and (4) the high speed network/Ethernet configurable network port transmits the Ethernet message slices received from the Ethernet message dicing/slicing module through the physical layer.

For a message from other nodes through the physical layer, it is processed as follows: (1) the high speed network/Ethernet configurable network port receives Ethernet message slices from the physical layer and sends the Ethernet message slices to the Ethernet message dicing/slicing module; (2) the Ethernet message dicing/slicing module receives the Ethernet message slices from the high speed network/Ethernet configurable network port, dices/slices the Ethernet message slices into an Ethernet message according to the routing table configuration if the Ethernet message slices arrive at the present node, and then sends the Ethernet message to the Ethernet network card core logic. (3) the Ethernet core logic receives the Ethernet message from the Ethernet message dicing/slicing module, and then sends Ethernet message to the PCIE host interface processing module after processing; and (4) the PCIE host interface processing module receives the Ethernet message from the Ethernet network card core logic, and then transmits the message to the connected node via the PCIE interface.

(III) The message in the EoH mode is transmitted as follows:

The message from the present node is processed as follows: (1) the PCIE host interface processing module receives the message from the connected node through the PCIE interface, and sends the message to the Ethernet network card core logic; (2) the Ethernet network card core logic processes the message into an Ethernet message, and then sends the Ethernet message to the Ethernet message dicing/slicing module; (3) the Ethernet message dicing/slicing module receives the Ethernet message from the Ethernet network card core logic, dices the Ethernet message into multiple Ethernet message slices, and then sends the Ethernet message slices to the EoH; (4) the high speed network/Ethernet message conversion module EoH receives the Ethernet message from the Ethernet message dicing/slicing module, encapsulates the EOH head, converts the message into a long MP message, and sends the long MP message to the XBAR; (5) the crossbar switch XBAR receives the long MP message from the EoH, then exchanges the long MP message traffic among multiple network ports without blocking, and then sends the dynamically allocated message to the corresponding high speed network/Ethernet configurable network port according to the routing table configuration; and (6) the high speed network/Ethernet configurable network port transmits the message received from the crossbar switch XBAR through the physical layer.

For a message sent from other nodes through the physical layer, it is processed as follows: (1) the high speed network/Ethernet configurable network port receives the long MP message from the physical layer and sends the message to the crossbar switch XBAR; (2) the crossbar switch XBAR receives the high speed network/Ethernet configurable network port, when the long MP message information shows that the destination node of message transmission is Ethernet, the crossbar switch XBAR sends the message to the high speed network/Ethernet message conversion module EoH; (3) the high speed network/Ethernet message conversion module EoH receives the long MP message from the crossbar switch XBAR, deletes EOH head, converts the message into an Ethernet message, and sends the Ethernet message to the Ethernet message dicing/slicing module; (4) the Ethernet message dicing/slicing module receives the Ethernet message slices from the EoH, dices/slices the Ethernet message slices into an Ethernet message, and then sends the Ethernet message to the Ethernet network card core logic; (5) the Ethernet core logic receives the Ethernet message from the Ethernet message dicing/slicing module, and then sends the Ethernet message to the PCIE host interface processing module after processing; and (6) the PCIE host interface processing module receives the Ethernet message from the Ethernet network card core logic, and then transmits the message to the connected node via the PCIE interface.

DESCRIPTION OF THE EMBODIMENTS

In order to make more clear the purpose, technical solutions and advantages of the application, the technical solutions of the application will be described below clearly and completely in combination with the applications and relevant figures of the application. Apparently, the applications described are simply part of the applications of the invention, rather than all of the applications. All other applications obtained by an ordinary person skilled in the art based on the applications herein without any creative work also fall within the protection scope of the Application.

Figure 1A:
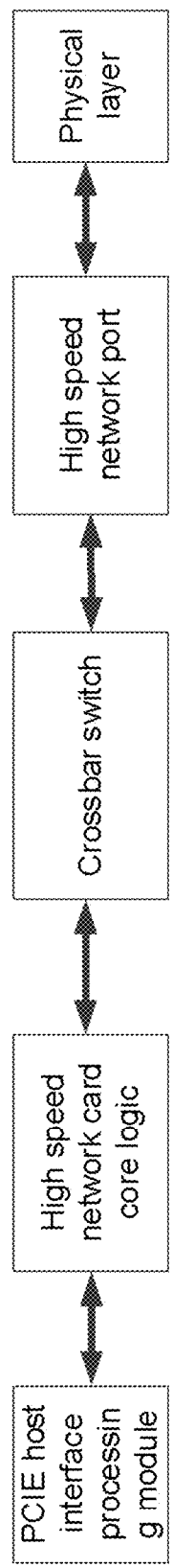
FIG. 1A is a diagram of general framework of a traditional high speed network card in the related art.
Figure 1B:
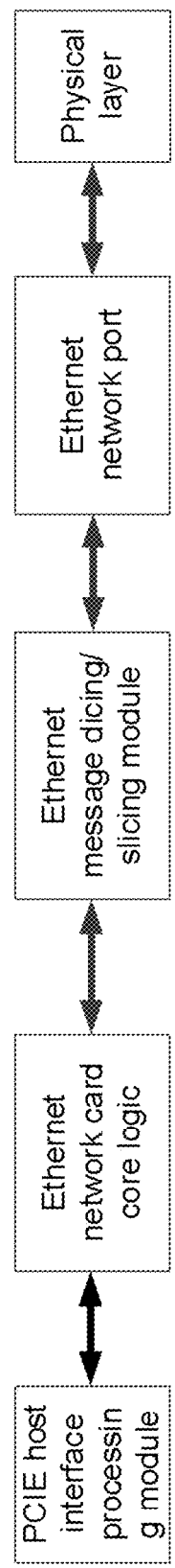
FIG. 1B is a diagram of general framework of a traditional Ethernet network card in the related art.
Figure 2:
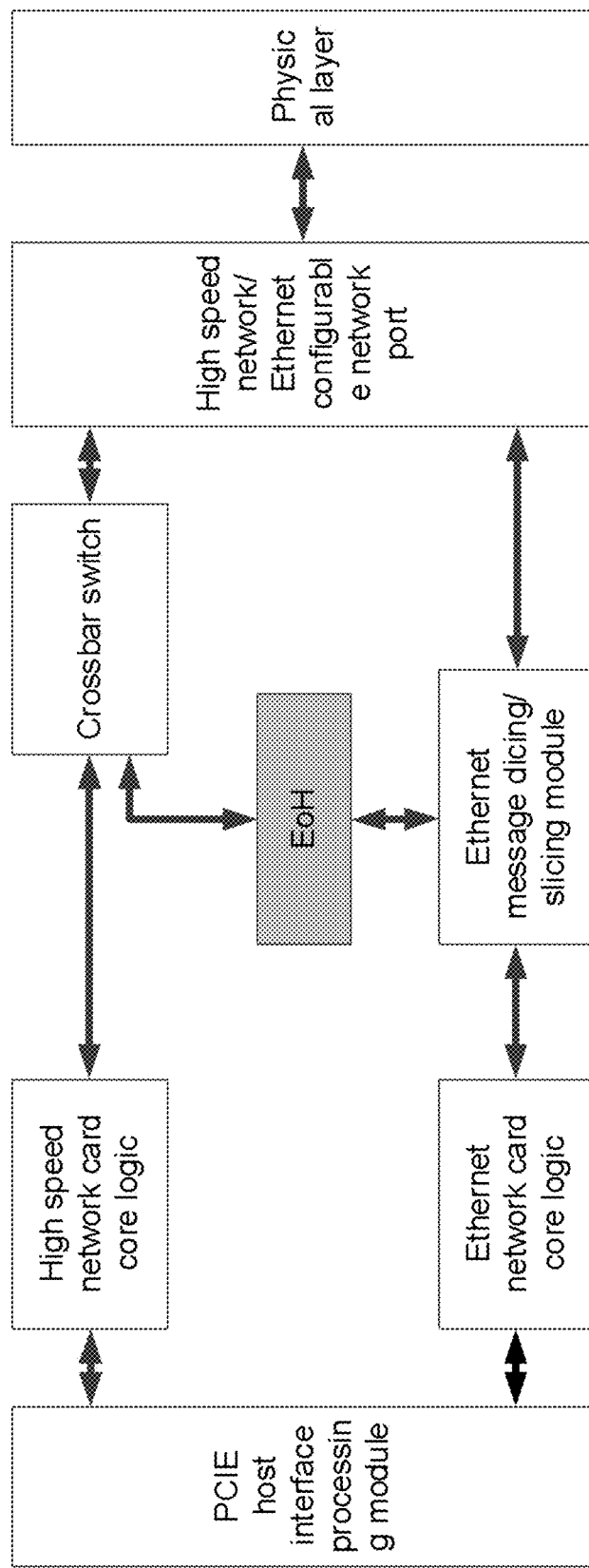
FIG. 2 is the structural diagram of the high speed network/Ethernet converged network interface card of the invention.

As shown in FIG. 2, the high speed network/Ethernet converged network interface card of the invention comprises not only a PCIE host interface processing module, a high speed network card core logic, a crossbar switch XBAR, an Ethernet network card core logic, an a Dicing/Slicing module, and a physical layer in the traditional Ethernet network card and high speed network card in the related art, but also a high speed network/Ethernet message conversion module (namely Ethernet Over High Performance Express, EOH) and a high speed network/Ethernet configurable network port.

The PCIE host interface processing module is connected with nodes in a computer system, the high speed network card core logic and the Ethernet network card core logic, and is configured to implement communication with the PCIE interface, and connect the nodes in the system to a network. The PCIE host interface processing module receives messages from the nodes, and decides whether to send the messages from the nodes to the high speed network card core logic or the Ethernet network card core logic according to different communication modes of the nodes. The judgment basis is as follows: when a node is in the high speed network mode, that is, the node in communication with the present node is a high speed network node, the PCIE host interface processing module sends the messages to the high speed network card core logic; and when the node needs to use the Ethernet mode, that is, the node in communication with the present node is an Ethernet node, the PCIE host interface processing module sends the message to the Ethernet network card core logic. For a message from the physical layer, the PCIE host interface processing module receives the high speed network message from the high speed network card core logic, and then transmits the high speed network message to the connected node via the PCIE interface. The PCIE host interface processing module receives the Ethernet message from the Ethernet network card core logic, and then transmits the message to the connected node via the PCIE interface.

As with the related art, the high speed network card core logic is connected with the PCIE host interface processing module and the XBAR. The high speed network card core logic receives the message from the PCIE host interface processing module, processes the message into a high speed network message, and then sends the message to the crossbar switch XBAR. For a high speed network message from the physical layer, the high speed network core logic receives the message from the XBAR, and sends the message to the PCIE host interface processing module after processing.

As with the related art, the Ethernet network card core logic is connected with the PCIE host interface processing module and the Dicing/Slicing module. The Ethernet network card core logic receives the message from the PCIE host interface processing module, processes the message into an Ethernet message, and then sends the Ethernet message to the Dicing/Slicing module. For a message from the physical layer, the Ethernet core logic receives the message from the Dicing/Slicing module, and then sends the message to the PCIE host interface processing module after processing.

The XBAR is connected with the high speed network card core logic, the high speed network/Ethernet configurable network port, and the EoH. The XBAR implements dynamic allocation of PCIE traffic in multiple network ports, exchanges the message traffic received from the high speed network card core logic or the EoH among the multiple network ports without blocking, dynamically allocates the message, and sends the message to the high speed network/Ethernet configurable network port. For a message from the physical layer, the XBAR receives the message from the high speed network/Ethernet configurable network port; if the message information shows that the destination node of message transmission is the high speed network, the XBAR sends the message to the high speed network card core logic; and if the message information shows that the destination node of message transmission is Ethernet, the XBAR sends the message to the EoH.

The Dicing/Slicing module is connected with the Ethernet network card core logic, the high speed network/Ethernet configurable network port and the EoH. The Dicing/Slicing module receives the Ethernet message from the Ethernet network card core logic, and dices the Ethernet message into Ethernet message slices. If the message information shows that the destination node of message transmission is the high speed network, the Dicing/Slicing module sends the Ethernet message slices to the EoH. If the message information shows that the destination node of message transmission is Ethernet, the Dicing/Slicing module directly sends the Ethernet message slices to the high speed network/Ethernet configurable network port. For a message from the physical layer, the Dicing/Slicing module receives the Ethernet message slices from the high speed network/Ethernet message conversion module EoH or the high speed network/Ethernet configurable network port, dices/slices the Ethernet message slices into an Ethernet message, and then sends the Ethernet message to the Ethernet network card core logic.

The EoH is connected with the XBAR and the Dicing/Slicing module. The EoH virtualizes the high speed network into Ethernet, so that the nodes connected in the high speed network directly communicate with the nodes connected in the Ethernet network. The function of the EoH is mainly implemented by dicing and encapsulating the Ethernet message in the high speed network. The message formed by dicing the Ethernet message by the EoH and encapsulating in the high speed network message is recorded as a long MP message. The EoH receives the long MP message from the XBAR, deletes EOH head, converts the message into an Ethernet message, and sends the Ethernet message to the Dicing/Slicing module; or the EoH receives the Ethernet message from the Dicing/Slicing module, encapsulates the EOH head, converts the message into a long MP message, and sends the long MP message to the XBAR.

The high speed network/Ethernet configurable network port is connected with the XBAR, the Dicing/Slicing module and the physical layer. The high speed network/Ethernet configurable network port receives a high speed network message from the XBAR, is configured as a high speed network port, and then transmits the high speed network message via the physical layer. The high speed network/Ethernet configurable network port receives an Ethernet message from the Dicing/Slicing module, is configured as an Ethernet network port, and then transmits the Ethernet message via the physical layer. For a message from the physical layer, the high speed network/Ethernet configurable network port sends the received high speed network messages to the XBAR or the received Ethernet messages to the Dicing/Slicing module according to the message configuration.

The physical layer is connected with the high speed network/Ethernet configurable network port and network interface cards or routers of other external nodes. The physical layer receives the high speed network message or the Ethernet message from the high speed network/Ethernet configurable network port, and transmits the message to other nodes.

The interfaces between the EOH module and the Dicing/Slicing module and CSR module are described as follows:

TABLE 1

Interfaces for Slicing in the EoH and the Dicing/Slicing Module

| Signal name | Width bit | Direction | Notes |
| --- | --- | --- | --- |
| slic_sop_valid | 1 | O | SOP data is valid |
| slic_mop_valid | 1 | O | MOP data is valid |
| slic_eop_valid | 1 | O | EOP data is valid |
| slic_data | 256 | O | Data |
| slic_head | 1 | O | Message slice head, the first beat flag of each slice |
| slic_tail | 1 | O | Message slice tail, the last beat flag of each slice |
| slic_hirar_free | 1 | I | Credit release signal, initial credit = 64 |

TABLE 2

Interfaces for Dicing in the EoH and the Dicing/Slicing Module

| Signal name | Width bit | Direction | Notes |
| --- | --- | --- | --- |
| dice_hirar_data_valid | 1 | I | The data is valid |
| dice_hirar_data | 256 | I | Data |
| dice_hirar_head | 1 | I | Flag bit of the first beat data of message, pulse signal. |
| dice_hirar_tail | 1 | I | Flag bit of the last beat data of message, pulse signal. |
| EoH_dice_free | 1 | O | Credit release signal, initial credit = 32 |

TABLE 3

Interfaces between the EoH and the CSR

| Signal name | Width bit | Direction | Notes |
| --- | --- | --- | --- |
| | | | Logical CSR ring of the EoH module |
| reg_chain_addr_in | 20 | I | 20-bit address of input of the CSR chain |
| reg_chain_code_in | 3 | I | Input command code of the CSR chain |
| reg_chain_data_in | 64 | I | 64-bit data of input of the CSR chain |
| reg_chain_valid_in | 1 | I | Input valid signal of the CSR chain |
| reg_chain_addr_out | 1 | O | Output valid signal of the CSR chain |
| reg_chain_code_out | 3 | O | Output command code of the CSR chain |
| reg_chain_data_out | 20 | O | 20-bit address of input of the CSR chain |
| reg_chain_valid_out | 64 | O | 64-bit data of output of the CSR chain |

TABLE 4

Interfaces between the EoH and the XBAR

| Signal name | Width bit | Direction | Notes |
|---|---|---|---|
| Logical CSR ring of the EoH module | | | |
| eth_xb_vld | 1 | O | Data from Ethernet to the XBAR is valid |
| eth_xb_data | 530 | O | Data from Ethernet to the XBAR |
| xb_eth_release | 8 | I | Reverse credit release from the XBAR to Ethernet |
| xb_eth_fifo_credit_release | 1 | I | Internal fifo credit of XBAR, minus 1 for pulse, 32 depth fifo |
| xb_eth_vld | 1 | I | Data from the XBAR to Ethernet is valid |
| xb_eth_data | 520 | I | Data from the XBAR to Ethernet |
| eth_hptx_credit_release | 1 | O | Reverse credit release from Ethernet to the XBAR |
| eth_xb_release | 8 | O | 8VC reverse credit release from Ethernet to the XBAR |

Figure 3:
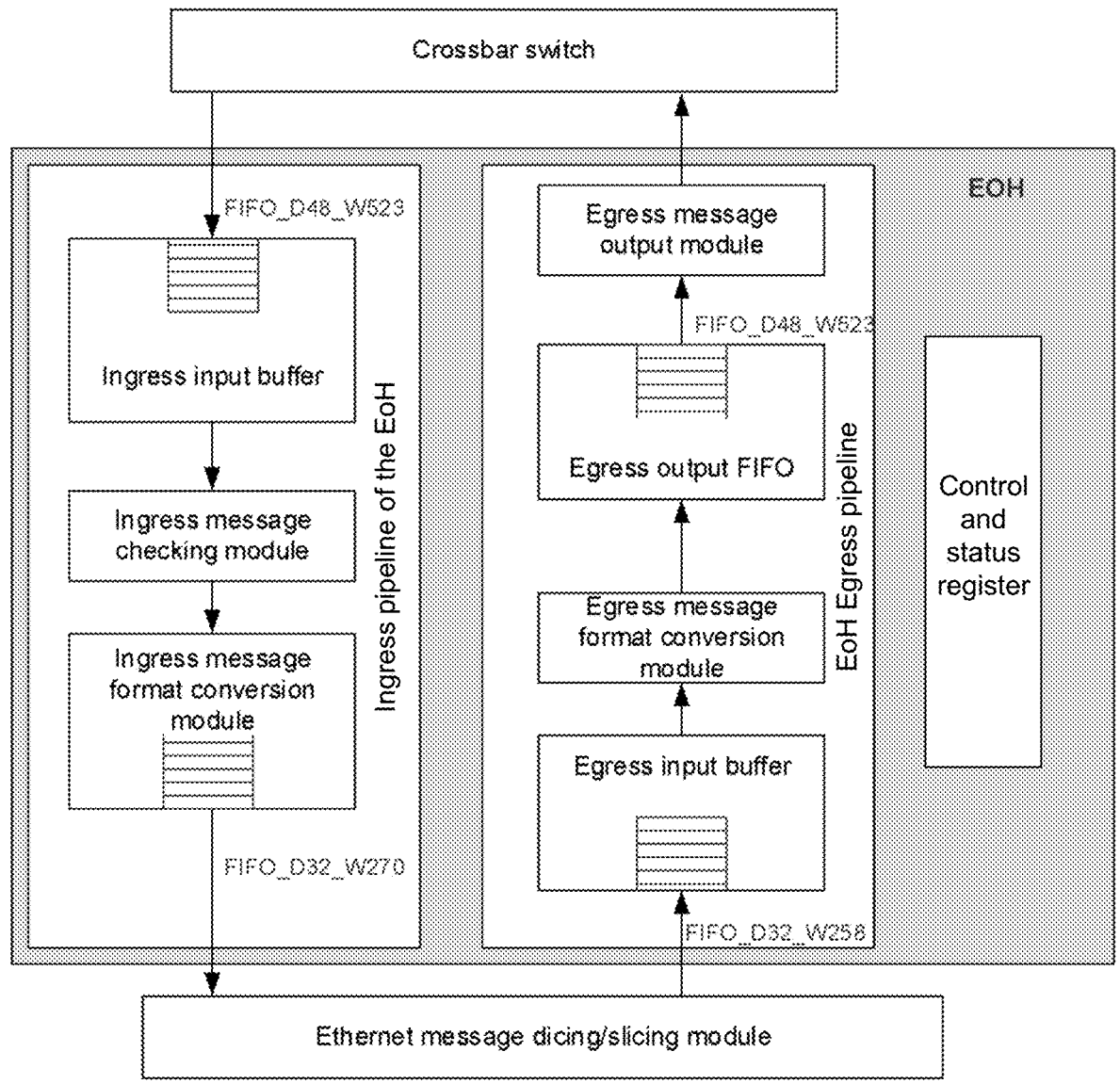
FIG. 3 is a logic structure diagram of the EOH of the invention.

As shown in FIG. 3, the EoH module contains three modules: (1) data ingress processing pipeline processing logic (EoH Ingress Process) namely Ingress pipeline; (2) data output processing pipeline processing logic (EoH Egress Process) namely Egress pipeline; and (3) CSR (control and status register) module. The Ingress pipeline receives the long MP message from the XBAR, deletes the EOH head, converts the message into an Ethernet message, and sends the Ethernet message to the Dicing/Slicing module. The Egress pipeline receives the Ethernet message from the Dicing/Slicing module, encapsulates the EOH head, converts the Ethernet message into a long MP message, and sends the long MP message to the XBAR. The CSR module controls the Ingress pipeline and the Egress pipeline through register configuration.

The Ingress pipeline of the EoH module comprises three logic submodules: an Ingress input buffer, an Ingress message checking module and an Ingress message format conversion module.

The Ingress input buffer is connected with the XBAR and the Ingress message checking module.

The Ingress input buffer receives the long MP message from the XBAR and stores the message in the Ingress input buffer. The Ingress message checking module is connected with the Ingress input buffer and the Ingress message format conversion module. The Ingress message checking module reads the long MP message from the Ingress input buffer, checks correctness of the long MP message, such as the VC (virtual channel), message length and message type, and then sends the high speed network message to the Ingress message format conversion module.

The Ingress message format conversion module is connected with the Ingress message checking module and the Dicing/Slicing module. The Ingress message format conversion module comprises an Ingress output FIFO. The Ingress message format conversion module receives the long MP message from the message checking module, deletes the EoH head information, de-encapsulates the long MP message to generate Ethernet message slices, stores the Ethernet message slices in the Ingres output FIFO, and dices and sends the Ethernet message slices stored in the Ingres output FIFO into the Dicing/Slicing module in the Ethernet in sequence.

The Egress pipeline of the EoH module comprises four logic submodules: an Egress input buffer, an Egress message format conversion module, an Egress output FIFO and an Egress message output module.

The Egress input buffer is connected with the Dicing/Slicing module and the Egress message format conversion module. The Egress input buffer receives the Ethernet message slices from the Dicing/Slicing module and caches the Ethernet message slices to the Egress input buffer.

The Egress message format conversion module is connected with the Egress input buffer and the Egress output FIFO. An Egress direction core module completes the function of Ethernet message slice reorganization, fills in the route information of the Ethernet message after the reorganization, and constructs the EoH head. The Egress message format conversion module reads the Ethernet message slices from the Egress input buffer, constructs the EoH head, cuts message payload according to slice configuration, fills single sequence message length/sequence number count/total message length in an LLP (Link Level Protocol) head, distinguishes message sequence slices by the head and tail information, encapsulates the Ethernet message into a long MP message, and then stores the long MP message into the Egress output FIFO.

The Egress output FIFO is connected with the Egress message format conversion module and the Egress message output module. The Egress output FIFO receives and caches the long MP message from the Egress message format conversion module.

The Egress message output module is connected with the Egress output FIFO and the XBAR.

The Egress message output module reads the long MP message from the Egress output FIFO and outputs the message to the XBAR.

Figure 4:
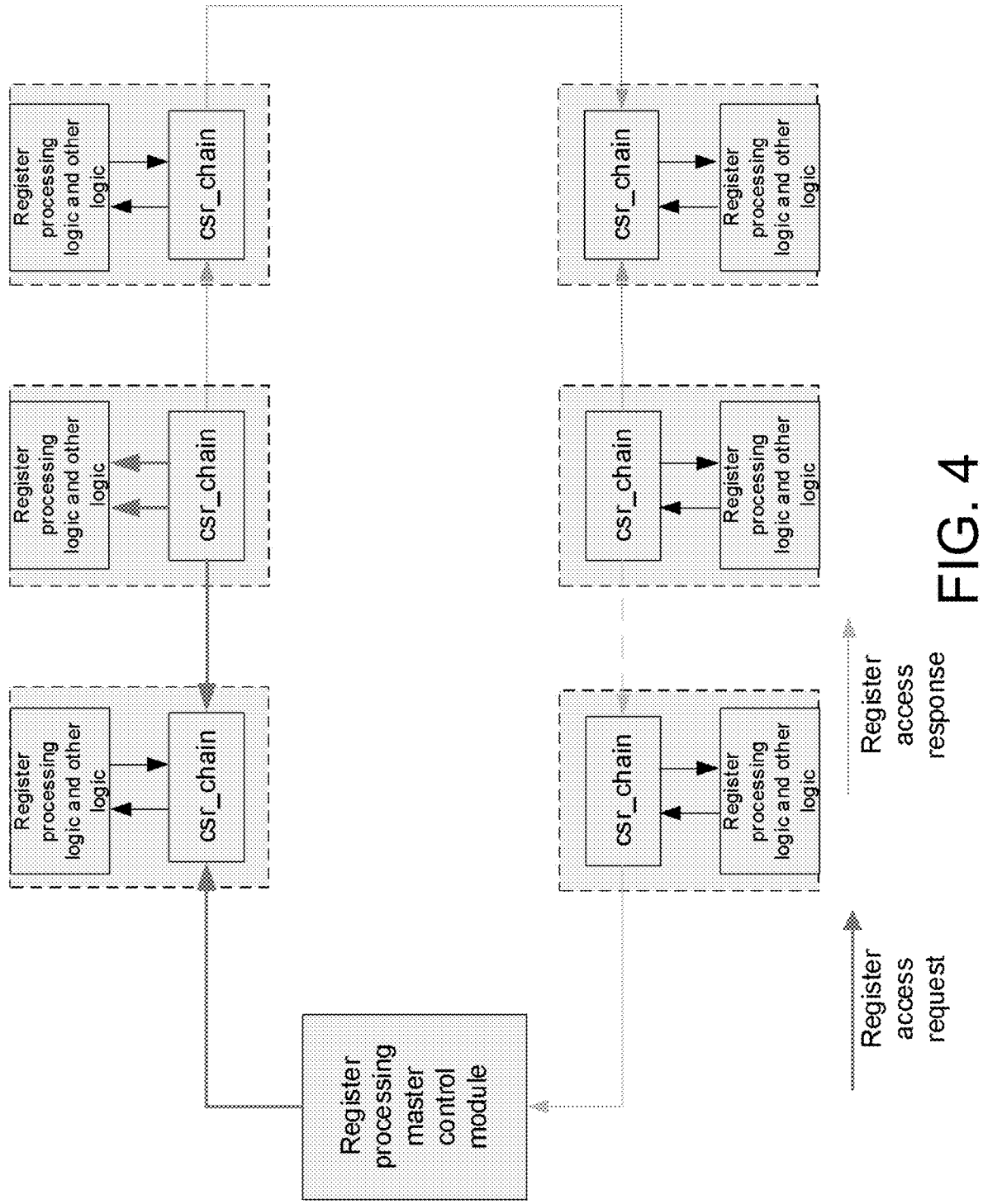
FIG. 4 is a diagram of implementing register read-write access in the CSR of the invention.

As shown in FIG. 4, in the application of the invention, the CSR module access uses the standard CSR ring structure, bit width of the register is 64 bits, and access address of the register is 20 bits, including 8-bit module address and 12-bit internal offset address of the module. The CSR module provides two CSR connection interfaces to the outside, namely one table CSR and one logical CSR. The table CSR cascades the tables in the EoH, while the logical CSR connects the submodules of the Ingress pipeline and the Egress pipeline in the EoH.

Figure 5:
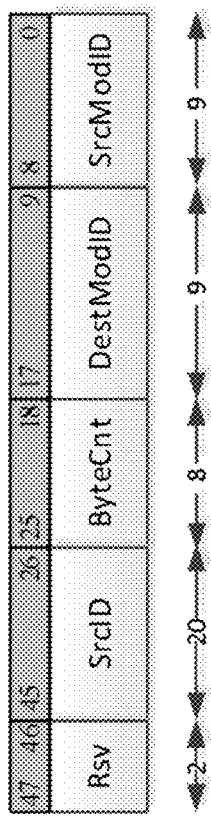
FIG. 5 illustrates the EOH head information format in the application of the invention.

As shown in FIG. 5, in the application of the invention, the Egress message format conversion module encapsulates not only the Ethernet messages but also 6-byte EoH head to better support MOD_ID and NIC_ID mapping relationship learning and other functions. As shown in FIG. 5, from low bit to high bit, each domain of the EoH head is described as follows: [8:0] is the transmitting end module number MOD_ID, and the domain name is recorded as SrcModID; [17:9] is the receiving end module number MOD_ID, and the domain name is recorded as DestModID; [25:18] is the Ethernet message length, and the domain name is recorded as ByteCnt; [45:26] is the transmitting end NIC_ID, and the domain name is recorded as SrcID; and [47:46] is a reserved bit, and the domain name is recorded as Rsv. The MOD_ID refers to the module number, which is a field composed of network interface chip number and network port number and configured to identify message source and destination addresses. The NIC_ID is the number of the Ethernet network card in the high speed network. To access the high speed network, the Ethernet network card needs a number on the high speed network, the NIC_ID is the high speed network number of the Ethernet network card.

In combination with FIG. 6, the message format from the XBAR directions in the EoH is as follows:

(1) A long MP 10 flit message contains 1 head flit, 1 tail flit and 8 data flits, that is, the message only contains 256B data.

(2) A long MP 6 flit message contains 1 head flit, 1 tail flit and 4 data flits, that is, the message only contains 128B data.

(3) A long MP 4 flit message contains 1 head flit, 1 tail flit and 2 data flits, that is, the message contains only 64B data.

At present, the sequence messages are designed to be fixed length (10flit format)+variable length (4/6/10flit) sequence tail message mode. That is, during message encapsulation, when the data content is enough to be encapsulated into 10flit format, the data content is encapsulated into 10flit message, and for the remaining part insufficient to be encapsulated into 10flit format, the message length is determined according to the remaining data length, and a short format is preferred for encapsulation. For example, the 641B message is diced into two complete 10flit EoH messages and the last 10flit sequence tail message, and contains 129B data+127B (fill in 0). For another example, a 257B message is diced into one complete 10flit EoH message and the last 4flit sequence tail message, and contains 1B data+63B (fill in 0).

Figure 6:
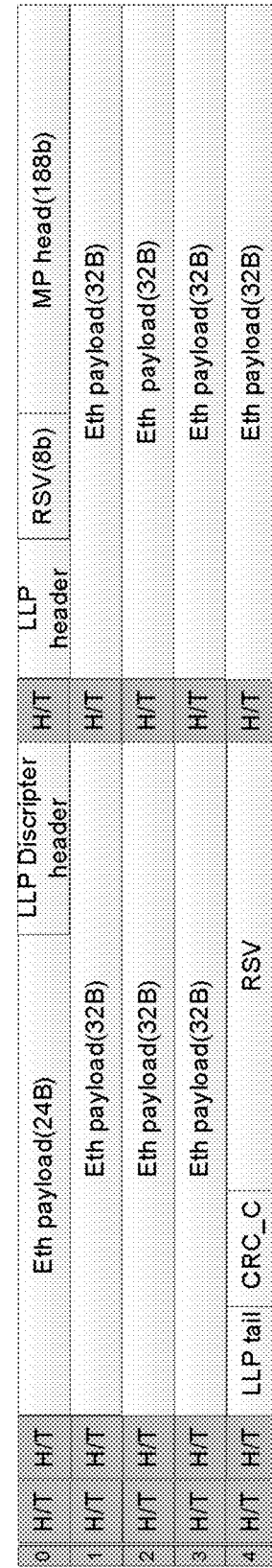
FIG. 6 is a diagram of the long MP 10flit message format from the XBAR direction in the application of the invention.

As can be seen from FIG. 6, the message payload in the XBAR direction also contains 8B lmp information. Before entering Ethernet, this part of information should be placed into Ethernet information. After the message is looped back from the Egress pipeline to the EoH, this part of information is taken out and put in front of the message head.

Figure 7:
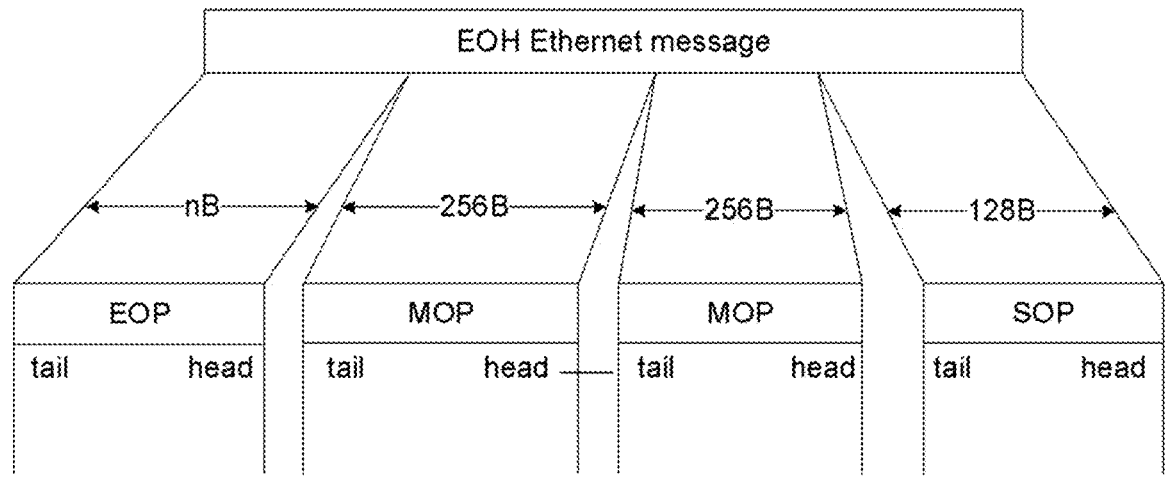
FIG. 7 is a diagram of the message format sent to the Dicing/Slicing direction in the application of the invention.

In combination with FIG. 7, the message format sent to the Dicing/Slicing direction follow the following rules:

(1) The Ethernet message length ranges from 64 to 1536;

(2) The data channel bit width is 32B. At the last beat of data (tail), LBO (last byte out) signal is enabled, 1 means 1B data is valid, 31 means 31B data is valid, and so on, 0 means 32B is valid;

(3) As SOP (start of package), MOP (middle of package), and EOP (end of package) are separately stored at Dicing/Slicing, credit controls are separated at the exit of the EoH;

(4) Sop_valid needs to be continuously fixed to be ≤128B. A single message is considered to end when eop_valid and tail are simultaneously valid for the Dicing/Slicing.

Figure 8:
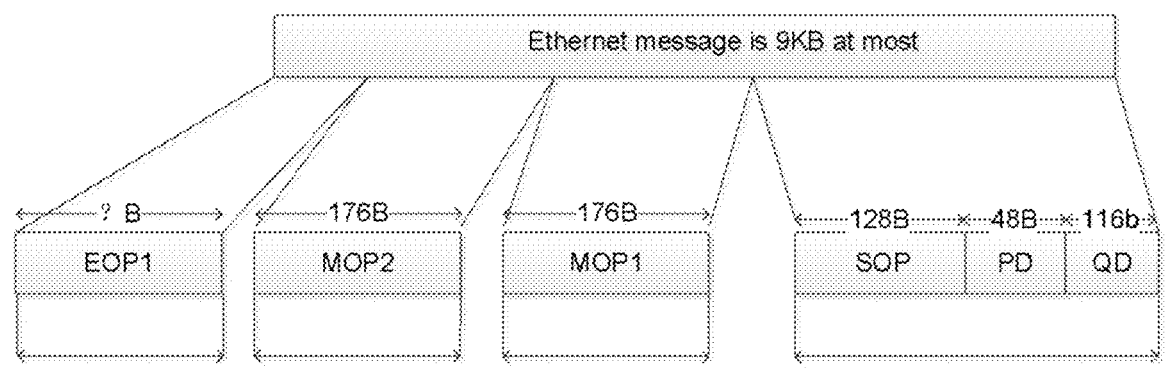
FIG. 8 is a diagram of a message received from the Dicing/Slicing direction in the application of the invention.

In combination with FIG. 8, the message received from the Dicing/Slicing direction: the first and second beats of the message received from the Dicing/Slicing are an egress queue descriptor (QD) and an ingress package descriptor (PD) respectively, and the Ethernet message starts from the third beat. It should be noted that the length of the MOP is diced by 176B. In the application of the invention, the data path of the Dicing/Slicing and EoH is 32B, and the MOP slice cannot be exactly divided. Therefore, the Egress pipeline direction of the EOH needs to subject to simple data dislocation (by gearbox) to fill up all data after dislocation.

The technical problem to be solved by the invention is to, in view of technical problems in the related art such as failure in simultaneously supporting high speed network and Ethernet in an interconnection network in a computer system, and failure in effectively supporting multiple applications such as computing-intensive and data-intensive applications, provide a converged network interface card, a message coding method and a message transmission method thereof, which support customized high speed interconnect and standard Ethernet interface on a set of network hardware, support three working modes on a set of physical hardware: high speed network mode, Ethernet mode, and EOH (Ethernet over high performance express) mode for transmitting Ethernet messages via the high speed network, implement seamless compatibility between the high speed network/Ethernet, and flexibly support multimode applications such as scientific computing and cloud computing.

The following effects can be achieved by means of the invention:

1. Efficient conversion is implemented between the Ethernet message and the high speed network message by means of the EoH based on hardware, switching of the network port is implemented between the high speed network transmission mode and the Ethernet transmission mode by means of the configuration, and interconnection and intercommunication between two network devices are implemented;

2. The invention supports three working modes on a set of physical hardware (high speed network mode, Ethernet mode and EoH mode transmitting Ethernet messages over the high speed network), implements seamless compatibility between the high speed network/Ethernet, and flexibly supports multimode applications such as scientific computing and cloud computing.

What is claimed is:

1. A converged network interface card comprises a PCIE host interface processing module, a high speed network card core logic, a crossbar switch XBAR, an Ethernet network card core logic, an Ethernet message dicing/slicing module, and a physical layer, wherein the converged network interface card further comprises a high speed network/Ethernet message conversion module EoH, and a high speed network/Ethernet configurable network port;

the PCIE host interface processing module is connected with nodes in a computer system, the high speed network card core logic and the Ethernet network card core logic, and is configured for communication with a PCIE interface, and connect the nodes in the system to a network; the PCIE host interface processing module receives messages from the nodes, and decides whether to send the messages from the nodes to the high speed network card core logic or the Ethernet network card core logic according to different communication modes of the nodes; the basis of judgment is as follows: when a node in communication with the present node is a high speed network node, it is determined that the node needs to use the high speed network mode, and the PCIE host interface processing module sends the message to the high speed network card core logic; and when a node in communication with the present node is an Ethernet node, it is determined that the node needs to use the Ethernet mode, and the PCIE host interface processing module sends the message to the Ethernet network card core logic; for a message from the physical layer, the PCIE host interface processing module receives the high speed network message from the high speed network card core logic, and then transmits the high speed network message to the connected node via the PCIE interface; the PCIE host interface processing module receives the Ethernet message from the Ethernet network card core logic, and then transmits the message to the connected node via the PCIE interface;

the high speed network card core logic is connected with the PCIE host interface processing module and the crossbar switch XBAR; the high speed network card core logic receives the message from the PCIE host interface processing module, processes the message into a high speed network message, and then sends the message to the crossbar switch XBAR; for a high speed network message from the physical layer, the high speed network core logic receives the message from the crossbar switch XBAR, and sends the message to the PCIE host interface processing module after processing;

the Ethernet network card core logic is connected with the PCIE host interface processing module and the Ethernet message dicing/slicing module; the Ethernet network card core logic receives the message from the PCIE host interface processing module, processes the message into an Ethernet message, and then sends the Ethernet message to the Ethernet message dicing/slicing module; for a message from the physical layer, the Ethernet core logic receives the Ethernet message from the Ethernet message dicing/slicing module, and then sends the Ethernet message to the PCIE host interface processing module after processing;

the crossbar switch XBAR is connected with the high speed network card core logic, the high speed network/Ethernet configurable network port, and the high speed network/Ethernet message conversion module EoH; the crossbar switch XBAR is configured to implement dynamic allocation of PCIE traffic in multiple network ports, exchanges the message traffic, which is received from the high speed network card core logic or the high speed network/Ethernet message conversion module EoH, among the multiple network ports without blocking, dynamically allocates the message, and sends the message to the high speed network/Ethernet configurable network port; for a message from the physical layer, the crossbar switch XBAR receives the message from the high speed network/Ethernet configurable network port; if the message information shows that the destination node of message transmission is the high speed network, the crossbar switch XBAR sends the message to the high speed network card core logic; if the message information shows that the destination node of message transmission is Ethernet, the crossbar switch XBAR sends the message to the high speed network/Ethernet message conversion module EoH;

the Ethernet message dicing/slicing module is connected with the Ethernet network card core logic, the high speed network/Ethernet configurable network port and the high speed network/Ethernet message conversion module EoH; the Ethernet message dicing/slicing module receives the Ethernet message from the Ethernet network card core logic, and dices the Ethernet message into Ethernet message slices; if the message information shows that the destination node of message transmission is the high speed network, the Ethernet message dicing/slicing module sends the Ethernet message slices to the high speed network/Ethernet message conversion module EoH; if the message information shows that the destination node of message transmission is Ethernet, the Ethernet message dicing/slicing module directly sends the Ethernet message slices to the high speed network/Ethernet configurable network port; for a message from the physical layer, the Ethernet message dicing/slicing module receives the Ethernet message slices from the high speed network/Ethernet message conversion module EoH or the high speed network/Ethernet configurable network port, dices/slices the Ethernet message slices into an Ethernet message, and then sends the Ethernet message to the Ethernet network card core logic;

the high speed network/Ethernet message conversion module EoH is connected with the crossbar switch XBAR and the Ethernet message dicing/slicing module; the high speed network/Ethernet message conversion module EoH virtualizes the high speed network into Ethernet, so that the nodes connected in the high speed network directly communicate with the nodes connected in the Ethernet network; the function of the high speed network/Ethernet message conversion module EoH is implemented by dicing the Ethernet message and encapsulating it in the high speed network message; the message formed by dicing the Ethernet message by the high speed network/Ethernet message conversion module EoH and encapsulating in the high speed network message is recorded as a long MP message; the high speed network/Ethernet message conversion module EoH receives the long MP message from the crossbar switch XBAR, deletes EOH head, converts the message into an Ethernet message, and sends the Ethernet message to the Ethernet message dicing/slicing module; or the high speed network/Ethernet message conversion module EoH receives the Ethernet message from the Ethernet message dicing/slicing module, encapsulates the EOH head, converts the message into a long MP message, and sends the long MP message to the XBAR;

the high speed network/Ethernet configurable network port is connected with the crossbar switch XBAR, the Ethernet message dicing/slicing module and the physical layer; the high speed network/Ethernet configurable network port receives a high speed network message from the crossbar switch XBAR, is configured as a high speed network port, and then transmits the high speed network message via the physical layer; the high speed network/Ethernet configurable network port receives an Ethernet message from the Ethernet message dicing/slicing module, is configured as an Ethernet network port, and then transmits the Ethernet message via the physical layer; for a message from the physical layer, the high speed network/Ethernet configurable network port sends the received high speed network messages to the crossbar switch XBAR or sends the received Ethernet messages to the Ethernet message dicing/slicing module according to the message configuration;

the physical layer is connected with the high speed network/Ethernet configurable network port and network interface cards or routers of other external nodes; the physical layer receives the high speed network message or the Ethernet message from the high speed network/Ethernet configurable network port, and transmits the message to other nodes.

2. The converged network interface card as recited in claim 1, wherein the high speed network/Ethernet message conversion module EoH comprises three modules:

an Ingress pipeline used as a data input processing pipeline processing logic;

an Egress pipeline used as a processing logic for data output processing pipeline; and a control and status register CSR module; the Ingress pipeline receives the long MP message from the XBAR, deletes the EOH head, converts the message into an Ethernet message, and sends the Ethernet message to the Ethernet message dicing/slicing module;

the Egress pipeline receives the Ethernet message from the Ethernet message dicing/slicing module, encapsulates the EOH head, converts the Ethernet message into a long MP message, and sends the long MP message to the XBAR; the control and status register CSR module controls the Ingress pipeline and the Egress pipeline through register configuration.

3. The converged network interface card as recited in claim 1, wherein the control and status register CSR module uses a standard CSR ring structure, bit width of the register is 64 bits, and access address of a register is 20 bits, including 8-bit module address and 12-bit internal offset address of the module; the control and status register CSR module provides two CSR connection interfaces to outside, namely one table CSR and one logical CSR; the table CSR cascades tables in the high speed network/Ethernet message conversion module EoH, while the logical CSR cascades submodules of the Ingress pipeline and the Egress pipeline in the high speed network/Ethernet message conversion module EoH.

4. The converged network interface card as recited in claim 2, wherein the Ingress pipeline of the EoH module comprises three logic submodules: an Ingress input buffer, an Ingress message checking module and an Ingress message format conversion module;

the Ingress input buffer is connected with the crossbar switch XBAR and the Ingress message checking module; the Ingress input buffer receives the long MP message from the crossbar switch XBAR and stores the message in the Ingress input buffer;

the Ingress message checking module is connected with the Ingress input buffer and the Ingress message format conversion module; the Ingress message checking module reads the long MP message from the Ingress input buffer, checks correctness of the long MP message, and then sends the high speed network message to the Ingress message format conversion module;

the Ingress message format conversion module is connected with the Ingress message checking module and the Ethernet message dicing/slicing module; the Ingress message format conversion module comprises one Ingress output FIFO; the Ingress message format conversion module receives the long MP message from the message checking module, deletes EoH head information, de-encapsulates the long MP message to generate Ethernet message slices, stores the Ethernet message slices in Ingres output FIFO, and dices and sends the Ethernet message slices stored in the Ingres output FIFO into the Ethernet message dicing/slicing module in Ethernet in sequence;

the Egress pipeline comprises: an Egress input buffer, an Egress message format conversion module, an Egress output FIFO and an Egress message output module;

the Egress input buffer is connected with the Ethernet message dicing/slicing module and the Egress message format conversion module; the Egress input buffer receives the Ethernet message slices from the Ethernet message dicing/slicing module and caches the Ethernet message slices to the Egress input buffer;

the Egress message format conversion module is connected with the Egress input buffer and the Egress output FIFO; the Egress message format conversion module reads the Ethernet message slices from the Egress input buffer, constructs the EoH head, cuts message payload according to slice configuration, fills single sequence message length/sequence number count/total message length in an LLP head, distinguish message sequence slices by head and tail information, encapsulates the Ethernet message into a long MP message, and then stores the long MP message into the Egress output FIFO;

the Egress output FIFO is connected with the Egress message format conversion module and the Egress message output module; the Egress output FIFO receives and caches the long MP message from the Egress message format conversion module;

the Egress message output module is connected with the Egress output FIFO and the crossbar switch XBAR; the Egress message output module reads the long MP message from the Egress output FIFO and outputs the message to the crossbar switch XBAR.

5. The converged network interface card as recited in claim 4, wherein the Ingress input buffer and the Egress input buffer are multi-VC shared buffer DAMQ, and the Ethernet messages are stored and scheduled via the multi-VC shared buffer DAMQ.

6. The converged network interface card as recited in claim 4, wherein the data encapsulated by the Egress message format conversion module not only the Ethernet messages but also 6-byte EoH head; from low bit to high bit, each domain of the EoH head is described as follows: [8:0] is a module number MOD_ID of transmitting end; [17:9] is a module number MOD_ID of receiving end; [25:18] is length of Ethernet message; [45:26] is NIC_ID of transmitting end; and [47:46] is a reserved bit; MOD_ID refers to module number, which is a field composed of a chip number of a network interface chip and a network port number and configured to identify message source and destination addresses; NIC_ID is number of a Ethernet network card in a high speed network.

7. The converged network interface card as recited in claim 3, wherein a read-write access of a register in a CSR ring structure is implemented as follows: each module instantiates a ring register access common module csr_chain, register access request is passed on a CSR ring, each module on the CSR ring processes the access request based on a register access address, and if the access request is a register access of a module address, a corresponding register read-write processing is performed; each module on the CSR ring passes a register access response to a register processing master control module in turn.

8. A message coding method, comprising:
receiving message format from the direction of a crossbar switch XBAR,
sending the message format to the direction of an Ethernet message dicing/slicing module, and
receiving message from the direction of the Ethernet message dicing/slicing module, wherein:
receiving the message format from the direction of the crossbar switch XBAR, comprising: sequence messages are designed to be fixed length and variable length sequence tail message mode; the length of fixed length sequence message is recorded as K message slices, and the length of variable length sequence tail message is recorded as K' message slices, wherein K and K' are natural numbers, K'≤K; during message encapsulation, when data content is enough to be encapsulated into K message slices, the data content is encapsulated into K message slice messages, and for the insufficient part of remaining data to be encapsulated into K message slices, the message length is determined according to remaining data length, and a short folinat is preferred for encapsulation;

sending the message format to the direction of the Ethernet message dicing/slicing module, comprising: an interface to the direction of the Ethernet message dicing/slicing module follows the following rules: (1) an Ethernet message length range is 64-1536B; (2) a data channel bit width is 32B; and when a last beat of data tails, a significant byte number signal LBO of the last beat is enabled; (3) Credits Sop_valid, Eop_valid and Mop_valid of SOP (start of package), middle of package MOP, and end of package EOP are separately controlled; (4) credit Sop_valid of packet head SOP needs to be continuously fixed to be ≤128B; and a single message ends when Eop_valid and tail are valid for the Ethernet message dicing/slicing module; and receiving the message from the Ethernet message dicing/slicing module, comprising: first and second beats of the message received from the Ethernet message dicing/slicing module are an egress queue descriptor QD and an ingress package descriptor PD respectively, and the message starts from third beat.

9. A message transmission method, comprising: three communication modes: high speed network mode, Ethernet mode and EoH mode; and specific communication mode depends on protocol configuration:

(I) the message transmission method in the high speed network mode is as follows:

for the message from a present node, a processing flow is as follows: (1) a PCIE host interface processing module receives the message from a node in a connected high performance computer system via a PCIE interface, and sends the message to a high speed network card core logic; (2) the high speed network card core logic processes the message into a high speed network message, and then sends the message to a crossbar switch XBAR; (3) the crossbar switch XBAR receives the high speed network message from the high speed network card core logic, then exchanges the high speed network message traffic among multiple network ports without blocking, and then sends the dynamically allocated message to the corresponding high speed network/Ethernet configurable network port according to a routing table configuration; and (4) the high speed network/Ethernet configurable network port transmits the message received from the crossbar switch XBAR through a physical layer;

for a message from other nodes through the physical layer, the processing flow is as follows: (1) the high speed network/Ethernet configurable network port receives the message from the physical layer and sends the message to the crossbar switch XBAR; (2) the crossbar switch XBAR receives the message from the high speed network/Ethernet configurable network port, and sends the message to the high speed network card core logic according to the routing table configuration if the message arrives at the present node; or sends the message to the corresponding high speed network/Ethernet configurable network port according to the routing table configuration if the message does not arrive at the present node, and then sends out the message through the physical layer; (3) the high speed network core logic receives the message from the crossbar switch XBAR, and sends the message to the PCIE host interface processing module after processing; and (4) the PCIE host interface processing module receives the message from the high speed network card core logic, and then transmits the message to nodes in the connected high performance computer system via the PCIE interface;

(II) The message transmission method in the Ethernet mode is as follows:

The message from the present node is processed as follows: (1) the PCIE host interface processing module receives the message from a connected node through the PCIE interface, and sends the message to the Ethernet network card core logic; (2) the Ethernet network card core logic processes the message into an Ethernet message, and then sends the Ethernet message to the Ethernet message dicing/slicing module; (3) the Ethernet message dicing/slicing module receives the Ethernet message from the Ethernet network card core logic, dices the Ethernet message into multiple Ethernet message slices, and then sends the Ethernet message slices to the high speed network/Ethernet configurable network port; and (4) the high speed network/Ethernet configurable network port transmits the Ethernet message slices received from the Ethernet message dicing/slicing module through the physical layer;

for a message from other nodes through the physical layer, it is processed as follows: (1) the high speed network/Ethernet configurable network port receives Ethernet message slices from the physical layer and sends the Ethernet message slices to the Ethernet message dicing/slicing module; (2) the Ethernet message dicing/slicing module receives the Ethernet message slices from the high speed network/Ethernet configurable network port, dices/slices the Ethernet message slices into an Ethernet message according to the routing table configuration if the Ethernet message slices arrive at the present node, and then sends the Ethernet message to the Ethernet network card core logic; (3) the Ethernet core logic receives the Ethernet message from the Ethernet message dicing/slicing module, and then sends Ethernet message to the PCIE host interface processing module after processing; and (4) the PCIE host interface processing module receives the Ethernet message from the Ethernet network card core logic, and then transmits the message to the connected node via the PCIE interface;

(III) The message in the EoH mode is transmitted as follows:

the message from the present node is processed as follows: (1) the PCIE host interface processing module receives the message from the connected node through the PCIE interface, and sends the message to the Ethernet network card core logic; (2) the Ethernet network card core logic processes the message into an Ethernet message, and then sends the Ethernet message to the Ethernet message dicing/slicing module; (3) the Ethernet message dicing/slicing module receives the Ethernet message from the Ethernet network card core logic, dices the Ethernet message into multiple Ethernet message slices, and then sends the Ethernet message slices to a high speed network/Ethernet message conversion module EoH; (4) the high speed network/Ethernet message conversion module EoH receives the Ethernet message from the Ethernet message dicing/slicing module, encapsulates an EOH head, converts the message into a long MP message, and sends the long MP message to the crossbar switch XBAR; (5) the crossbar switch XBAR receives the long MP message from the EoH, then exchanges the long MP message traffic among multiple network ports without blocking, and then sends the dynamically allocated message to the corresponding high speed network/Ethernet configurable network port according to the routing table configuration; and (6) the high speed network/Ethernet configurable network port transmits the message received from the crossbar switch XBAR through the physical layer;

for a message sent from other nodes through the physical layer, it is processed as follows: (1) the high speed network/Ethernet configurable network port receives the long MP message from the physical layer and sends the message to the crossbar switch XBAR; (2) the crossbar switch XBAR receives the high speed network/Ethernet configurable network port, when the long MP message information shows that the destination node of message transmission is Ethernet, the crossbar switch XBAR sends the message to the high speed network/Ethernet message conversion module EoH; (3) the high speed network/Ethernet message conversion module EoH receives the long MP message from the crossbar switch XBAR, deletes the EOH head, converts the message into an Ethernet message, and sends the Ethernet message to the Ethernet message dicing/slicing module; (4) the Ethernet message dicing/slicing module receives the Ethernet message slices from the high speed network/Ethernet message conversion module EoH, dices/slices the Ethernet message slices into an Ethernet message, and then sends the Ethernet message to the Ethernet network card core logic; (5) the Ethernet core logic receives the Ethernet message from the Ethernet message dicing/slicing module, and then sends the Ethernet message to the PCIE host interface processing module after processing; and (6) the PCIE host interface processing module receives the Ethernet message from the Ethernet network card core logic, and then transmits the message to the connected node via the PCIE interface.

* * * * *